US008433821B2

(12) United States Patent
Kudo

(10) Patent No.: US 8,433,821 B2
(45) Date of Patent: Apr. 30, 2013

(54) COMMUNICATION SYSTEM, TERMINAL DEVICE AND COMMUNICATION CONTROL DEVICE

(75) Inventor: Yasuhiro Kudo, Ichinomiya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 205 days.

(21) Appl. No.: 12/886,067

(22) Filed: Sep. 20, 2010

(65) Prior Publication Data

US 2011/0078330 A1  Mar. 31, 2011

(30) Foreign Application Priority Data

Sep. 30, 2009 (JP) .................. 2009-228510

(51) Int. Cl.
*G06F 15/16* (2006.01)

(52) U.S. Cl.
USPC ........... 709/245; 709/228; 709/223; 370/315; 726/15

(58) Field of Classification Search .................. 709/223, 709/245, 228; 370/315; 726/12
See application file for complete search history.

(56) References Cited

U.S. PATENT DOCUMENTS

| 7,409,462 | B2* | 8/2008 | Kuno ........................... 709/245 |
| 7,542,466 | B2 | 6/2009 | Ikenaga et al. |
| 7,933,273 | B2 | 4/2011 | Takeda et al. |
| 8,144,704 | B2 | 3/2012 | Miyajima et al. |
| 2008/0126528 | A1* | 5/2008 | Takeda et al. ................. 709/223 |
| 2008/0259943 | A1 | 10/2008 | Miyajima et al. |
| 2009/0313386 | A1 | 12/2009 | Hamamoto et al. |
| 2011/0200009 | A1 | 8/2011 | Takeda et al. |

FOREIGN PATENT DOCUMENTS

| JP | A-2005-151142 | 6/2005 |
| JP | A-2008/236297 | 10/2008 |
| JP | A-2008-289109 | 11/2008 |
| JP | A-2010-535004 | 11/2010 |
| JP | 2007-171133 | * 11/2012 |
| WO | WO 2008/035578 A1 | 3/2008 |
| WO | WO 2009/018004 A1 | 2/2009 |

OTHER PUBLICATIONS

Feb. 5, 2013 Japanese Office Action issued in Japanese Patent Application No. 2009/228510 (with translation).

* cited by examiner

*Primary Examiner* — Dang Ton
*Assistant Examiner* — Mewale Ambaye
(74) *Attorney, Agent, or Firm* — Oliff & Berridge, PLC

(57) ABSTRACT

A communication system including a communication control device connecting to an external network, a NAT device connecting to the external network, and a terminal device connecting to an internal network under control of the NAT device, the terminal device including a NAT information identification portion, a NAT information transmitting portion that transmits NAT type information to the communication control device, a type request transmitting portion, a type response receiving portion that receives the NAT type information transmitted from the communication control device in response to the type request signal, and a first communication portion that performs communication with another terminal device using the received NAT type information, the communication control device including a NAT information receiving portion, a storage control portion that stores the received NAT type information in a storage device, a type request receiving portion, and a type response transmitting portion that transmits the stored NAT type information.

13 Claims, 13 Drawing Sheets

FIG. 3

| NAT IDENTIFICATION INFORMATION | | NAT TYPE | RULE INFORMATION | | | | | BANDWIDTH UTILIZATION | REGISTRANT |
|---|---|---|---|---|---|---|---|---|---|
| MODEL NAME | VERSION | | MINIMUM VALUE | FIRST QUARTILE | MEDIAN | THIRD QUARTILE | MAXIMUM VALUE | | |
| WR-X1234 | 1.0 | Full Cone NAT | – | – | – | – | – | 0.0% | ADM. A |
| WR-X1234 | 1.1 | Full Cone NAT | – | – | – | – | – | 0.0% | ADM. B |
| WR-X1234 | 1.2 | Full Cone NAT | – | – | – | – | – | 4.2% | MAC:A |
| WR-X1234 | 1.2 | Symmetric NAT | 1 | 1 | 2 | 4 | 7 | 2.0% | MAC:B |
| ZZZ-WR123 | 1.2 | Symmetric NAT | 1 | 2 | 3 | 5 | 7 | 9.5% | MAC:C |
| ZZZ-WR123 | 1.0 | Symmetric NAT | 1 | 1 | 2 | 2 | 4 | 0.3% | MAC:D |
| ZZZ-WR123 | 1.0 | Symmetric NAT | 1 | 3 | 4 | 6 | 74 | 13.0% | MAC:E |
| ZZZ-WR123 | 1.0 | ARC NAT | – | – | – | – | – | 2.2% | MAC:F |
| ZZZ-WR123 | 1.0 | PRC NAT | – | – | – | – | – | 1.5% | MAC:G |
| ZZZ-WR123 | 1.0 | | | | | | | 2.0% | MAC:H |

241

2411, 2412, 2413, 2414

COMMUNICATION SYSTEM, TERMINAL DEVICE AND COMMUNICATION CONTROL DEVICE

CROSS-REFERENCE TO RELATED APPLICATION

This application claims priority to Japanese Patent Application No. 2009-228510, filed Sep. 30, 2009, the disclosure of which is hereby incorporated by reference in its entirety.

BACKGROUND

The present invention relates to a communication system, a terminal device and a communication control device that perform communication with another terminal device that is under control of a different device provided with a network address translation (NAT) function (hereinafter referred to as a NAT device).

When peer to peer (P2P) communication is performed between terminal devices that are under control of different NAT devices (NAT routers, for example), types (Cone NAT, Symmetric NAT, and the like) of the NAT devices need to be identified. After the types of the NAT devices are identified, an appropriate communication procedure (User Datagram Protocol (UDP), hole punching, or the like) is selected and performed in accordance with the identified types. When communication is performed using an appropriate communication procedure, P2P communication becomes possible between the terminal devices.

For example, a communication device is proposed that accurately determines the type of the NAT device by adding improvement while complying with Request for Comments (RFC) 3489, as a method to identify the type of a NAT device.

SUMMARY

With the above-described method, the NAT type is determined by transmitting and receiving a plurality of packets between a terminal device and a server. As a result, a long time may be required until the NAT type is determined. Therefore, it may take a long time until P2P communication becomes possible between terminal devices.

Various exemplary embodiments of the general principles herein provide a communication system, a terminal device and a communication control device that are capable of starting P2P communication by rapidly determining a NAT type.

Exemplary embodiments provide a communication system that includes communication control device that connects to an external network, a network address translation (NAT) device that connects to the external network and that has a NAT function, and a terminal device that connects to an internal network that is under control of the NAT device. The terminal device includes a NAT information identification portion, a NAT information transmitting portion, a type request transmitting portion, a type response receiving portion, and a first communication portion. The NAT information identification portion identifies NAT type information of the NAT device. The NAT type information is type information, or the type information and rule information. The type information is information that classifies the NAT device. The rule information is information relating to an update rule of a port number based on which the NAT device performs port mapping. The NAT information transmitting portion transmits, to the communication control device, the NAT type information identified by the NAT information identification portion and NAT identification information that is information that identifies the NAT device. The type request transmitting portion transmits, to the communication control device, a type request signal together with the NAT identification information in order to communicate with another terminal device that is a communication partner. The type request signal requests transmission of the NAT type information. The type response receiving portion receives the NAT type information transmitted from the communication control device in response to the type request signal transmitted by the type request transmitting portion. The first communication portion performs communication with the other terminal device using the NAT type information received by the type response receiving portion. The communication control device includes a NAT information receiving portion, a storage control portion, a type request receiving portion, and a type response transmitting portion. The NAT information receiving portion receives the NAT identification information and the NAT type information transmitted by the NAT information transmitting portion. The storage control portion stores, in a storage device, the NAT identification information and the NAT type information received by the NAT information receiving portion in association with each other. The type request receiving portion receives the type request signal and the NAT identification information transmitted by the type request transmitting portion. The type response transmitting portion, based on the NAT identification information and the type request signal received by the type request receiving portion, in a case where the NAT type information associated with the NAT identification information is stored in the storage device, transmits the NAT type information stored in association with the NAT identification information, to the terminal device that has transmitted the type request signal.

Exemplary embodiments also provide a terminal device that connects to an internal network that is under control of a NAT device, the NAT device connecting to an external network and having a network address translation (NAT) function. The terminal device includes a NAT information identification portion, a NAT information transmitting portion, a type request transmitting portion, a type response receiving portion, and a first communication portion. The NAT information identification portion identifies NAT type information of the NAT device. The NAT type information is type information, or the type information and rule information. The type information is information that classifies the NAT device. The rule information is information relating to an update rule of a port number based on which the NAT device performs port mapping. The NAT information transmitting portion transmits, to a communication control device connected to the external network, the NAT type information identified by the NAT information identification portion, and NAT identification information that is information that identifies the NAT device. The type request transmitting portion transmits, to the communication control device, a type request signal together with the NAT identification information in order to communicate with another terminal device that is a communication partner. The type request signal requests transmission of the NAT type information. The type response receiving portion receives the NAT type information transmitted from the communication control device in response to the type request signal transmitted by the type request transmitting portion. The first communication portion performs communication with the other terminal device using the NAT type information received by the type response receiving portion.

Exemplary embodiments further provide a communication control device that connects to an external network. The communication control device includes a NAT information receiving portion, a storage control portion, a type request receiving portion, and a type response transmitting portion. The NAT information receiving portion receives NAT identification information and NAT type information transmitted from a terminal device. The terminal device connects to an internal network that is under control of a NAT device. The NAT device connects to the external network and has a network address translation (NAT) function. The NAT identification information is information that identifies the NAT device. The NAT type information is type information, or the type information and rule information. The type information is information that classifies the NAT device. The rule information is information relating to an update rule of a port number based on which the NAT device performs port mapping. The storage control portion stores, in a storage device, the NAT identification information and the NAT type information received by the NAT information receiving portion in association with each other. The type request receiving portion receives a type request signal and the NAT identification information transmitted from the terminal device. The type request signal is a signal that requests transmission of the NAT type information for the terminal device in order to communicate with another terminal device that is a communication partner. The type response transmitting portion, based on the type request signal and the NAT identification information received by the type request receiving portion, in a case where the NAT type information associated with the NAT identification information is stored in the storage device, transmits the NAT type information stored in association with the NAT identification information, to the terminal device that has transmitted the type request signal.

BRIEF DESCRIPTION OF THE DRAWINGS

Exemplary embodiments will be described below in detail with reference to the accompanying drawings in which:

FIG. 3 is a schematic diagram showing a NAT information table 241;

DETAILED DESCRIPTION OF THE EXEMPLARY EMBODIMENTS

Figure 1:
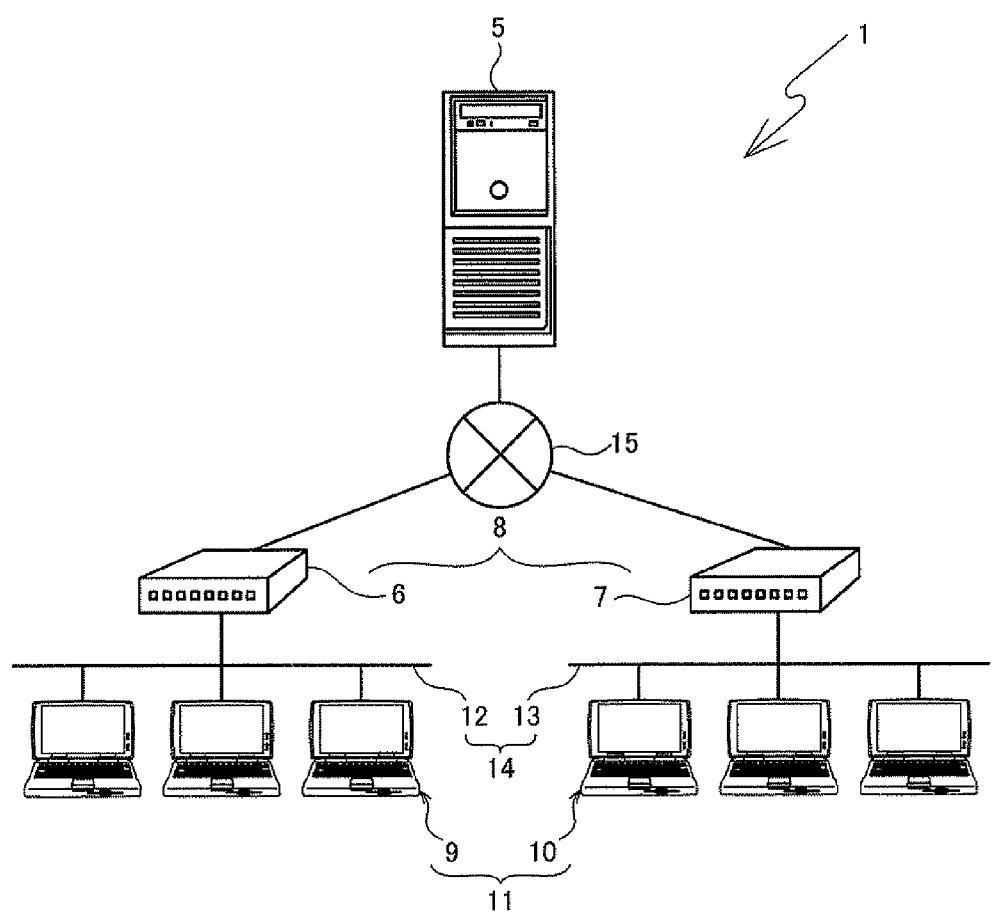
FIG. 1 is a schematic diagram showing an overview of a communication system 1.

Hereinafter, a communication system 1 according to the present invention will be explained with reference to the drawings. With reference to FIG. 1, an overview of the communication system 1 will be explained. The communication system 1 includes at least a communication control device 5, a NAT device 6, a NAT device 7, a terminal device 9 and a terminal device 10. Hereinafter, when the NAT devices 6 and 7 are collectively referred to, or when no distinction is made between the NAT devices 6 and 7, they are referred to as a "NAT device 8" or "NAT devices 8". When the terminal devices 9 and 10 are collectively referred to, or when no distinction is made between the terminal devices 9 and 10, they are referred to as a "terminal device 11" or "terminal devices 11". The communication control device 5 and the NAT devices 8 are connected to the Internet 15. The NAT devices 6 and 7 are respectively connected to a subordinate local area network (LAN) 12 and a subordinate LAN 13. Hereinafter, when the LAN 12 and the LAN 13 are collectively referred to, or when no distinction is made between the LAN 12 and the LAN 13, they are referred to as a "LAN 14" or "LANs 14". The terminal devices 11 are connected to the LANs 14. In the example shown in FIG. 1, the terminal device 9 is connected to the LAN 12 that is under control of the NAT device 6. The terminal device 10 is connected to the LAN 13 that is under control of the NAT device 7.

The communication control device 5 provides the terminal devices 11 with necessary information (a NAT type, rule information and the like, which will be described later in detail) to enable Peer to Peer (P2P) communication between the terminal devices 11. For example, a call control server or a Simple Traversal of UDP through NATs (STUN) server can be used as the communication control device 5. Based on information provided from the communication control device 5, the terminal device 11 can perform P2P communication with the other terminal device 11. A personal computer, for example, can be used as the terminal device 11. The NAT devices 8 are devices that are each provided with a NAT function. Based on a method that is used when determining whether or not to allow a received packet to be transferred, the NAT devices 8 can be classified into four types, that is, a Full Cone NAT, an Address-Restricted Cone NAT, a Port-Restricted Cone NAT and a Symmetric NAT. Hereinafter, each of these types is referred to as a "NAT type". The NAT devices 8 may perform port mapping based on a predetermined regularity (hereinafter referred to as an "update rule").

When P2P communication is performed between the terminal devices 11, a packet that is transmitted and received may be blocked by the NAT device 8. This is because, when the NAT device 8 receives a packet from the Internet 15 side, the NAT device 8 transfers the packet to the LAN 14 side, if the packet is a predetermined packet, and it does not transfer the packet if the packet is not a predetermined packet. It is necessary for the terminal device 11 to recognize the NAT type and the update rule of the NAT device 8 and to perform communication by setting, in a packet, a destination address and a port number that will not be blocked by the NAT device 8.

In the present embodiment, the communication control device 5 manages a NAT information table. The NAT information table stores the NAT type of the NAT device 8, and information (hereinafter referred to as "rule information") that can identify the update rule. When the terminal device 11 starts P2P communication, the terminal device 11 performs communication with the communication control device 5, and thereby acquires the NAT type and the rule information of the NAT device 8 to which the terminal device 11 itself is directly connected. The terminal device 11 identifies, based on the acquired NAT type and rule information, the destination address and the port number of the packet and thereby performs communication. Since it is not necessary for the terminal device 11 to perform a lot of communication, which is necessary if the NAT type and the update rule are directly identified from the NAT device 8, the terminal device 11 can rapidly acquire the NAT type and the rule information. Thus, in the communication system 1, it is possible to rapidly start P2P communication between the terminal devices 11.

In the present embodiment, the Internet 15 is used as an external network to which the NAT devices 8 are connected. In addition to the Internet 15, various known networks (a LAN, a wide area network (WAN), a dedicated line and the like) can be used. In a similar manner, the LANs 14 are used as internal networks that are under control of the NAT devices 8. In addition to the LANs 14, known networks (the Internet, a WAN, a dedicated line, and the like) can be used.

Figure 2:
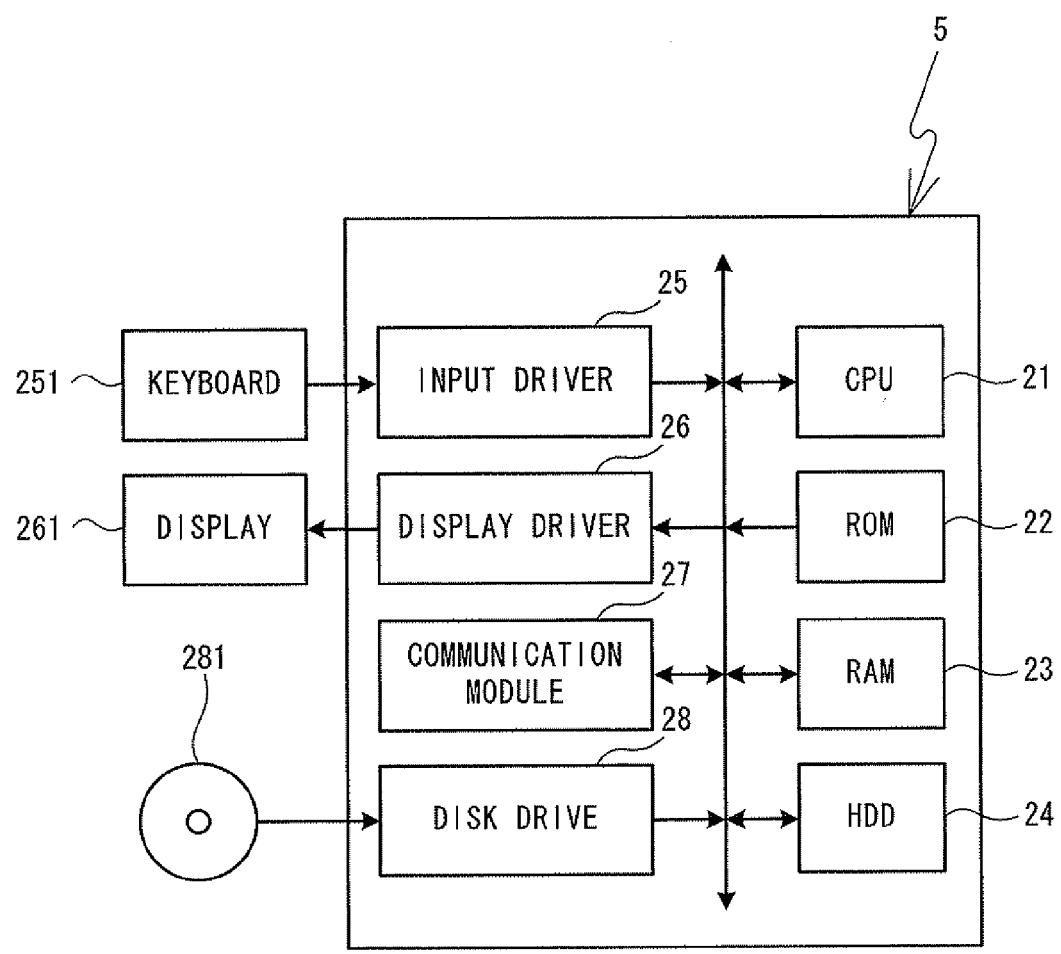
FIG. 2 is a block diagram showing an electrical configuration of a communication control device 5.

As shown in FIG. 2, the communication control device 5 includes a CPU 21, a ROM 22, a RAM 23 and an HDD 24. The CPU 21 controls communication with the NAT devices 8 and the terminal devices 11. At least a boot program and default parameters are stored in the ROM 22. At least temporary data generated during processing by the CPU 21 may be stored in the RAM 23. At least a program to be executed by the CPU 21 and a NAT information table (which will be described later) are stored in the HDD 24. The CPU 21 is electrically connected to the ROM 22, the RAM 23 and the HDD 24. The CPU 21 can access storage areas of the ROM 22, the RAM 23 and the HDD 24.

The communication control device 5 includes an input driver 25. The input driver 25 detects information that is input via a keyboard 251. The CPU 21 is electrically connected to the input driver 25. The input driver 25 is electrically connected to the keyboard 251. The CPU 21 can recognize the information that is input via the keyboard 251. The communication control device 5 includes a display driver 26. The display driver 26 performs control to display images on a display 261. The CPU 21 is electrically connected to the display driver 26. The display driver 26 is electrically connected to the display 261. The CPU 21 can cause a desired image to be displayed on the display 261.

The communication control device 5 includes a communication module 27. The communication module 27 enables communication via the Internet 15. The CPU 21 is electrically connected to the communication module 27. The CPU 21 can perform communication via the Internet 15. The communication control device 5 includes a disk drive 28. The disk drive 28 is a drive device to access information stored in a recording medium 281. The CPU 21 is electrically connected to the disk drive 28. When the recording medium 281 is inserted in the disk drive 28, the CPU 21 can access the information stored in the recording medium 281. The program to be executed by the CPU 21, for example, may be stored in the recording medium 281. When the communication control device 5 is set up, the program may be installed from the recording medium 281 to the HDD 24.

With reference to FIG. 3, a NAT information table 241, which is an example of the NAT information table stored in the HDD 24, will be explained. The NAT information table 241 stores information such as NAT identification information that identifies the NAT device 8 existing in the communication system 1, the NAT type, the rule information, a bandwidth utilization, and a registrant. The NAT identification information includes, for example, a model name of the NAT device 8 and a version number (hereinafter simply referred to as a "version") of a program. The rule information includes, for example, a minimum value, a first quartile, a median, a third quartile and a maximum value of changes in the port numbers.

As the model name included in the NAT identification information, the model name of the corresponding NAT device 8 is stored. As the version, the version number of the program stored in the ROM 52 (refer to FIG. 4) of the corresponding NAT device 8 is stored. The NAT identification information may be input via the keyboard 251 by an administrator of the communication control device 5. Each value stored as the rule information will be described later in detail. As the bandwidth utilization, a percentage of an actual data rate to a maximum data rate that is allowed in the LAN 14 is stored. The NAT type, the rule information and the bandwidth utilization may be transmitted from the terminal device 11, or directly input by the administrator of the communication control device 5. As the registrant, a MAC address of the terminal device 11 that has transmitted the NAT type, the rule information and the bandwidth utilization may be stored. In a case where the NAT type, the rule information and the bandwidth utilization are directly input by the administrator of the communication control device 5, the name of the administrator may be stored as the registrant.

For example, in FIG. 3, 10 pieces of information relating to 10 NAT devices, each of which has one of two model names "WR-X1234" and "ZZZ-WR123", is stored in the NAT information table 241. For example, among the NAT devices with the model name "WR-X1234", a NAT device (2411) whose version is "1.0" has the NAT type "Full Cone NAT." The rule information of this NAT device is not stored. The bandwidth utilization of this NAT device is "0.0%", and the registrant of this NAT device is an "administrator (abbreviated as "ADM." in the table) A." Among the NAT devices with the model name "ZZZ-WR123", a NAT device (2412) whose version is "1.2" has the NAT type "Symmetric NAT." Stored as the rule information of this NAT device are a minimum value of "1", a first quartile of "1", a median of "2", a third quartile of "4", and a maximum value of "7" of the changes in the port numbers. The bandwidth utilization of this NAT device is "9.5%", and the registrant of this NAT device is "MAC:C." As shown in FIG. 3, for the NAT devices whose NAT type is "Symmetric NAT", corresponding rule information is stored in the NAT information table. Note that, in FIG. 3, the Address-Restricted Cone NAT is denoted as "ARC NAT" (2413), and the Port-Restricted Cone NAT is denoted as "PRC NAT" (2414). Hereinafter, information of the above-described items is collectively referred to as "NAT information".

Figure 4:
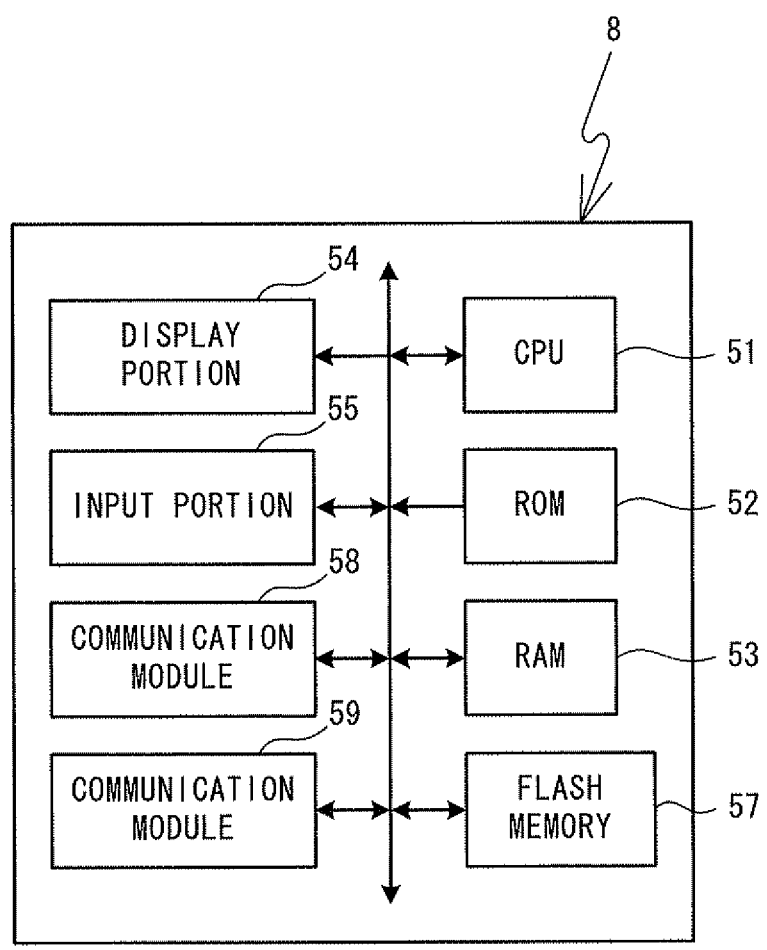
FIG. 4 is a block diagram showing an electrical configuration of a NAT device 8.

As shown in FIG. 4, the NAT device 8 includes a CPU 51, the ROM 52, a RAM 53 and a flash memory 57. The CPU 51 controls communication with the communication control device 5 and the terminal devices 11. At least a program to be executed by the CPU 51 is stored in the ROM 52. At least temporary data generated during processing by the CPU 51 may be stored in the RAM 53. A port number may be stored in the flash memory 57 as history information. The CPU 51, the ROM 52, the RAM 53 and the flash memory 57 are electrically connected. The CPU 51 can access storage areas of the ROM 52, the RAM 53 and the flash memory 57.

The NAT device 8 is provided with a display portion 54. The display portion 54 can display a status etc. of the NAT device 8. The CPU 51 is electrically connected to the display portion 54. The CPU 51 can cause desired information to be displayed on the display portion 54. An LED can be used as the display portion 54, for example. The NAT device 8 includes an input portion 55. The input portion 55 receives an input operation to the NAT device 8 by a user. The CPU 51 is electrically connected to the input portion 55. The CPU 51 recognizes information input via the input portion 55. A switch or a touch sensor, for example, can be used as the input portion 55.

The NAT device 8 includes a communication module 58 and a communication module 59. The communication module 58 enables communication via the Internet 15. The CPU 51 is electrically connected to the communication module 58. The CPU 51 can perform communication via the Internet 15. The communication module 59 enables communication via the LANs 14. The CPU 51 is electrically connected to the communication module 59. The CPU 51 can perform communication via the LANs 14.

Figure 5:
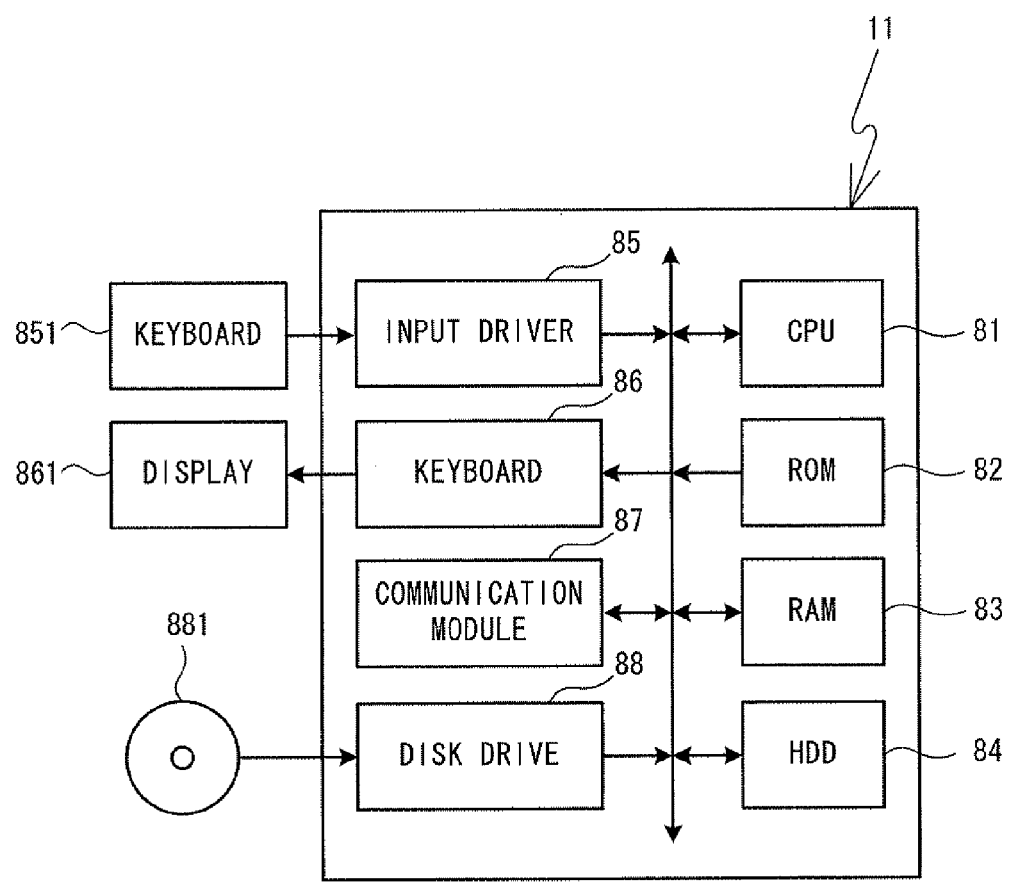
FIG. 5 is a block diagram showing an electrical configuration of a terminal device 11.

As shown in FIG. 5, the terminal device 11 includes a CPU 81, a ROM 82, a RAM 83 and an HDD 84. The CPU 81 controls communication with the NAT devices 8 and the communication control device 5. At least a boot program and default parameters are stored in the ROM 82. At least temporary data generated during processing by the CPU 81 may be stored in the RAM 83. At least a program to be executed by the CPU 81 is stored in the HDD 84. The CPU 81 is electrically connected to the ROM 82, the RAM 83 and the HDD 84. The CPU 81 can access storage areas of the ROM 82, the RAM 83 and the HDD 84.

The terminal device 11 includes an input driver 85. The input driver 85 detects information that is input via a keyboard 851. The CPU 81 is electrically connected to the input driver 85. The input driver 85 is electrically connected to the keyboard 851. The CPU 81 can recognize the information that is input via the keyboard 851. The terminal device 11 includes a display driver 86. The display driver 86 performs control to display images on a display 861. The CPU 81 is electrically connected to the display driver 86. The display driver 86 is electrically connected to the display 861. The CPU 81 can cause a desired image to be displayed on the display 861.

The terminal device 11 includes a communication module 87. The communication module 87 enables communication via the LANs 14. The CPU 81 is electrically connected to the communication module 87. The CPU 81 can perform communication via the LANs 14. The terminal device 11 includes a disk drive 88. The disk drive 88 is a drive device to access information stored in a recording medium 881. The CPU 81 is electrically connected to the disk drive 88. When the recording medium 881 is inserted in the disk drive 88, the CPU 81 can access the information stored in the recording medium 881. The program to be executed by the CPU 81, for example, may be stored in the recording medium 881. When the terminal device 11 is set up, the program may be installed from the recording medium 881 to the HDD 84.

With reference to FIG. 6 to FIG. 10, first terminal device processing will be described. When a power source of the terminal device 11 is turned on, the first terminal device processing is started and executed by the CPU 81. In the first terminal device processing, the NAT type (or the NAT type and the rule information) of the NAT device 8 that is directly connected to the terminal device 11 is acquired and transmitted to the communication control device 5 in order to cause the communication control device 5 to register information. In the description below, assuming a case where the NAT type (or the NAT type and the rule information) of the NAT device 6 is acquired by the terminal device 9 and transmitted to the communication control device 5, the first terminal device processing that is executed by the CPU 81 of the terminal device 9 will be described.

Figure 6:
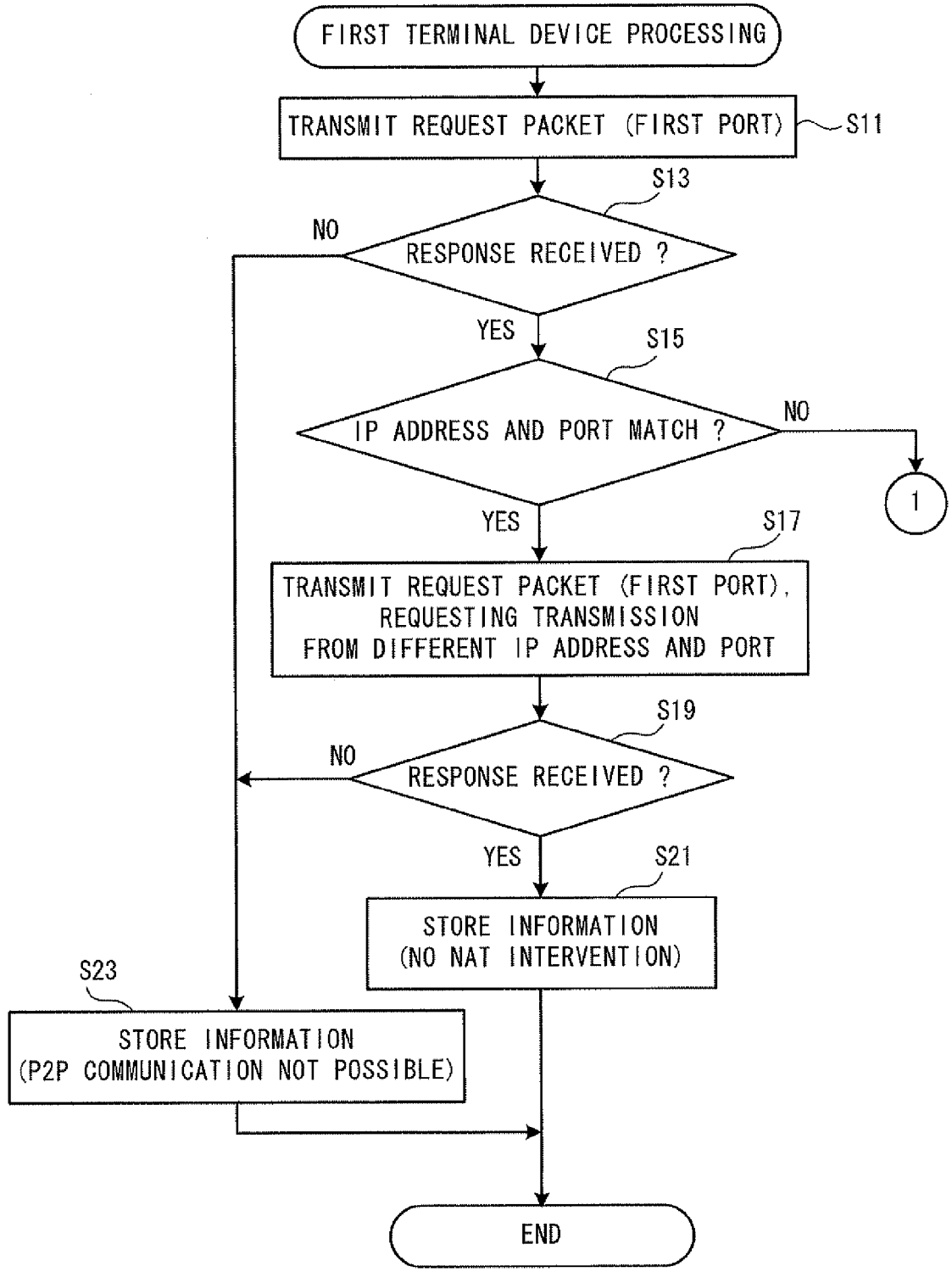
FIG. 6 is a flowchart showing first terminal device processing.

As shown in FIG. 6, a request packet is transmitted to a port (a first port) of the communication control device 5 (step S11). The request packet requests the communication control device 5 to transmit a response packet that includes an IP address (hereinafter referred to as "GIP") and a port number (hereinafter referred to as "GPort") of the NAT device 6 on the Internet 15 side. Note that, in a case where there is no NAT device 6 between the terminal device 9 and the communication control device 5, an IP address and a port number of a connection portion of the terminal device 9 connecting with the Internet 15 correspond to the GIP and the GPort. A determination is made as to whether the response packet has been received (step S13). In a case where the response packet has not been received (no at step S13), the terminal device 9 cannot identify the NAT type or the rule information of the NAT device 6. As a result, the terminal device 9 cannot perform P2P communication with the terminal device 10. Therefore, flag information indicating that P2P communication cannot be performed is temporarily stored in the RAM 83 (step S23). The CPU 81 terminates the first terminal device processing.

In a case where the response packet has been received from the communication control device 5 (yes at step S13), the GIP and the GPort included in the response packet are extracted from the response packet. A determination is made as to whether the IP address (hereinafter referred to as the "transmission source address") of the terminal device 9 matches the extracted GIP, and whether the port number (hereinafter referred to as the "transmission source port") that has been used when the terminal device 9 has transmitted the request packet matches the extracted GPort (step S15). In a case where the transmission source address and the GIP do not match and/or in a case where the transmission source port and the GPort do not match (no at step S15), this indicates that the NAT device 6 is located between the terminal device 6 and the communication control device 5. In this case, the CPU 81 advances to processing at step S31 shown in FIG. 7.

In a case where the transmission source address and the GIP match and the transmission source port and the GPort also match (yes at step S15), a request packet, which requests that a response packet be transmitted to the terminal device 9, is transmitted to the first port of the communication control device 5 (step S17). The request packet transmitted at step S17 requests, to the communication control device 5, that the response packet be transmitted from an IP address and a port number that are different from those of the response packet received at step S13. A determination is made as to whether the response packet has been received (step S19). In a case where the response packet has not been received (no at step S19), the NAT type or the rule information cannot be identified. As a result, the terminal device 9 cannot perform P2P communication with the terminal device 10. Therefore, flag information indicating that P2P communication cannot be performed is temporarily stored in the RAM 83 (step S23). The CPU 81 terminates the first terminal device processing.

In a case where the response packet has been received from the communication control device 5 (yes at step S19), the NAT device 6 is not located between the terminal device 9 and the communication control device 5. Therefore, flag information indicating that there is no intervention by the NAT device 6 is temporarily stored in the RAM 83 (step S21). The CPU 81 terminates the first terminal device processing.

Figure 7:
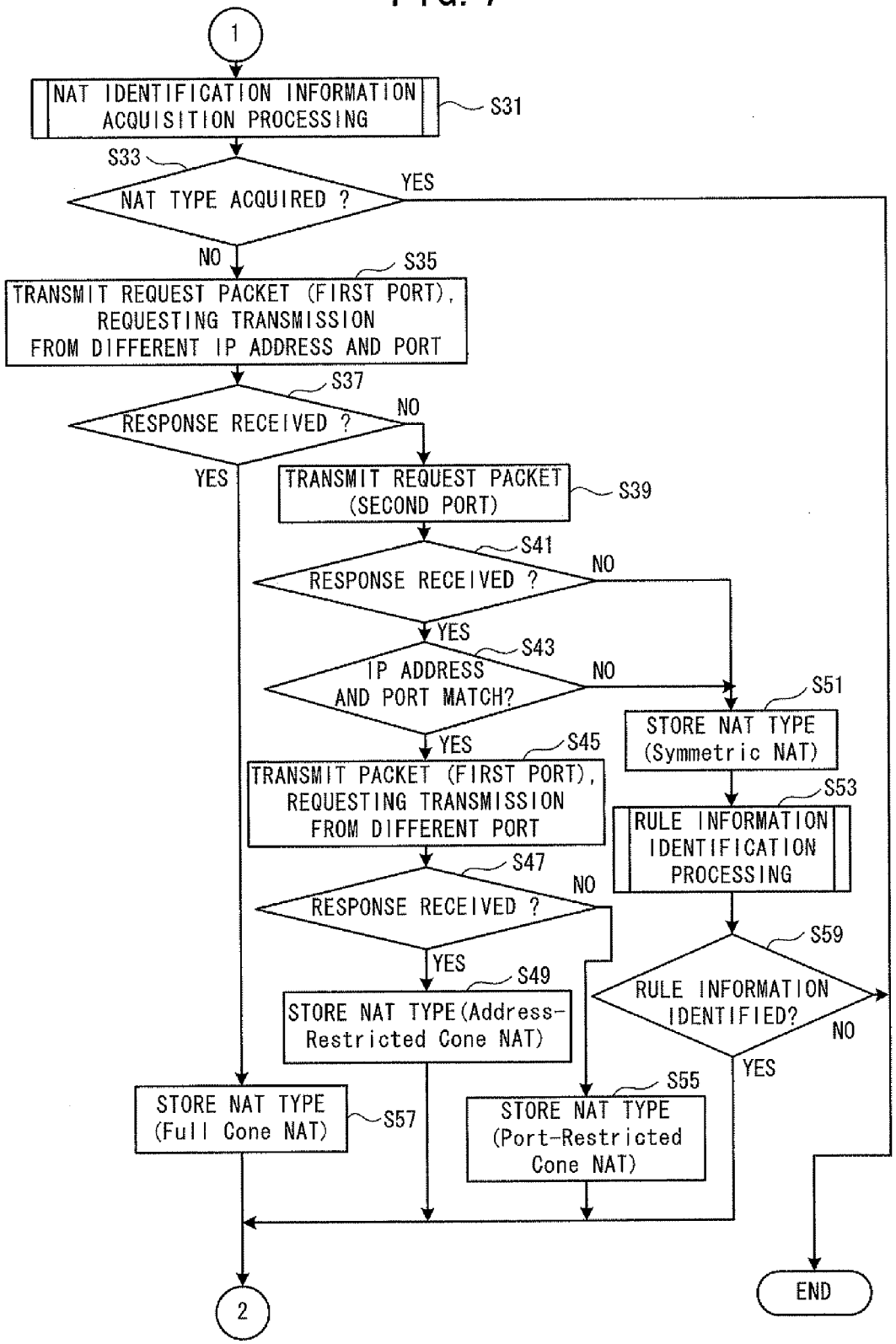
FIG. 7 is a flowchart showing the first terminal device processing, continued from FIG. 6.

In the processing at step S31 shown in FIG. 7, NAT identification information acquisition processing is performed (step S31). The NAT identification information acquisition processing will be explained with reference to FIG. 9. It is attempted to acquire, from the NAT device 6, the NAT identification information, the MAC address and IP address of the NAT device 8, and the bandwidth utilization of the LAN 12, by performing communication based on a Simple Network Management Protocol (SNMP) with the NAT device 6 (step S71). In a case where the acquisition has failed (no at step S73), flag information indicating that the acquisition of the NAT identification information has failed is temporarily stored in the RAM 83 (step S83). The CPU 81 terminates the NAT identification information acquisition processing, and returns to the first terminal device processing shown in FIG. 7.

In a case where the NAT identification information and the like have been acquired by the SNMP-based communication (yes at step S73), a determination is made as to whether the NAT device 6 is connected to the Internet 15 via another NAT device (this state is hereinafter referred to as a "multi-stage NAT state") (step S75). Whether the NAT device 6 is in the multi-stage NAT state may be determined in the following manner, for example. The GIP that is included in the response packet received in the processing at step S13 shown in FIG. 6 is compared with the IP address of the NAT device 6 acquired in the processing at step S71. In a case where the GIP and the IP address are different from each other, a determination is made that the NAT device 6 is in the multi-stage NAT state. In a case where the GIP and the IP address match, a determination is made that the NAT device 6 is directly connected to the Internet 15 and thus is not in the multi-stage NAT state.

In a case where a determination is made that the NAT device 6 is in the multi-stage NAT state (yes at step S76), flag information indicating the multi-stage NAT state is temporarily stored in the RAM 83 (step S85). The CPU 81 terminates the NAT identification information acquisition processing, and returns to the first terminal device processing shown in FIG. 7.

In a case where a determination is made that the NAT device 6 is not in the multi-stage NAT state (no at step S76), a type request packet that requests the NAT type and the rule information is transmitted to the communication control device 5 (step S77). The type request packet is transmitted together with the NAT identification information and the like (namely, the NAT identification information, the MAC address and IP address of the NAT device 6, and the bandwidth utilization of the LAN 12) that have been acquired in the processing at step S71. In a case where the response packet has not been received (no at step S79), the CPU 81 terminates the NAT identification information acquisition processing, and returns to the first terminal device processing shown in FIG. 7. In a case where the response packet has been received (yes at step S79), the NAT type included in the response packet is temporarily stored in the RAM 83 (step S81). In a case where the NAT type is Symmetric NAT, the rule information that is included in the response packet together with the NAT type is also temporarily stored in the RAM 83 (step S81). The CPU 81 terminates the NAT identification information acquisition processing, and returns to the first terminal device processing shown in FIG. 7.

As shown in FIG. 7, after the NAT identification information acquisition processing (step S31), a determination is made as to whether the NAT type has been acquired through the NAT identification information acquisition processing (step S33). In a case where the NAT type is stored in the RAM 83, the NAT type has been acquired in the NAT identification information acquisition processing (yes at step S33). In this case, the NAT type of the NAT device 6 has already been stored in the communication control device 5. Therefore, the CPU 81 terminates the first terminal device processing.

In a case where the NAT type is not stored in the RAM 83 (no at step S33), the NAT type of the NAT device 6 has not yet been stored in the communication control device 5. Therefore, in order to check the NAT type of the NAT device 6 and register the NAT type in the communication control device 5, the following processing is carried out.

A request packet requesting that a response packet be returned to the terminal device 9 is transmitted to the first port of the communication control device 5 (step S35). The request packet that is transmitted at step S35 requests, to the communication control device 5, that the response packet be transmitted from an IP address and a port number that are different from those of the response packet received at step S13. A determination is made as to whether the response packet has been received (step S37). In a case where the response packet has been received (yes at step S37), the NAT type of the NAT device 6 that is located between the terminal device 9 and the communication control device 5 is identified as being Full Cone NAT. This is because the NAT device 6 transfers the response packet even when the IP address and the port number of the transmission source of the response packet, namely, the IP address and the port number used by the communication control device 5 when transmitting the response packet, are different. Flag information indicating the identified NAT type, namely indicating Full Cone NAT, is temporarily stored in the RAM 83 (step S57). The CPU 81 advances to the processing at step S61 shown in FIG. 8.

In a case where the response packet has not been received (no at step S37), a request packet requesting that a response packet be transmitted to the terminal device 9 is transmitted to a port (a second port) of the communication control device 5 that has a different port number to the first port (step S39). A determination is made as to whether the response packet has been received (step S41). In a case where the response packet has been received (yes at step S41), the GIP and the GPort included in the response packet received at step S13 are compared with the GIP and the GPort included in the response packet received at step S41 (step S43). In a case where the GIPs match each other and the GPorts match each other (yes at step S43), a request packet requesting that a response packet be transmitted to the terminal device 9 is transmitted to the first port of the communication control device 5 (step S45). The request packet transmitted at step S45 requests, to the communication control device 5, that the response packet be transmitted from the same IP address and a different port number as the response packet received at step S41. A determination is made as to whether the response packet has been received (step S47). In a case where the response packet has been received (yes at step S47), the NAT type of the NAT device 6 is identified as being Address-Restricted Cone NAT. This is because the NAT device 6 transfers the response packet even when the port number of the transmission source of the response packet, namely, the port number used by the communication control device 5 when transmitting the response packet, is different. Flag information indicating the identified NAT type, namely indicating Address-Restricted Cone NAT, is temporarily stored in the RAM 83 (step S49). The CPU 81 advances to the processing at step S61 shown in FIG. 8.

In a case where the response packet has not been received (no at step S47), the NAT type of the NAT device 6 is identified as being Port-Restricted Cone NAT. This is because the NAT device 6 does not transfer the response packet when the port number of the transmission source of the response packet, namely, the port number used by the communication control device 5 when transmitting the response packet, is different. Flag information indicating the identified NAT type, namely indicating Port-Restricted Cone NAT, is temporarily stored in the RAM 83 (step S55). The CPU 81 advances to the processing at step S61 shown in FIG. 8.

In a case where the response packet has not been received (no at step S41), and in a case where the IP addresses do not match and the port numbers do not match, or in a case where either the IP addresses do not match or the port numbers do not match (no at step S43), the NAT type of the NAT device 6 is identified as being Symmetric NAT. Flag information indicating the identified NAT type, namely indicating Symmetric NAT, is temporarily stored in the RAM 83 (step S51). In order to identify the rule information, based on which the update rule of the NAT device 6 can be identified, rule information identification processing (step S53) is performed.

The rule information identification processing will be explained with reference to FIG. 10. A request packet requesting that a response packet be transmitted to the terminal device 9 is transmitted to a port (a third port) of the communication control device 5 that has a different port number to the first port and the second port (step S101). A determination is made as to whether the response packet has been received (step S103). In a case where the response packet has not been received (no at step S103), the CPU 81 cannot identify the rule information. Therefore, flag information indicating that the rule information cannot be identified is temporarily stored in the RAM 83 (step S113). The CPU 81 terminates the rule information identification processing, and returns to the first terminal device processing shown in FIG. 7.

In a case where the response packet has been received (yes at step S103), a determination is made as to whether the communication control device 5 is equipped with another port that has a port number other than those of the first, second and third ports (step S105). In a case where the communication control device 5 is equipped with another port having the port number other than those of the first, second and third ports (yes at step S105), the CPU 81 returns to the processing at step S101. The above-described processing, in which a request packet is transmitted to a port having a port number that has not been used, is repeatedly performed. By transmitting at least one request packet to at least one port in this manner and receiving a larger number of response packets, it is possible to improve an accuracy of statistical analysis that will be described later.

In a case where request packets have been transmitted to all the ports provided to the communication control device 5 (no at step S105), the following analysis is performed based on the GPorts included in the received response packets. A difference value between the GPort included in a response packet and the GPort included in a succeeding response packet is calculated for each consecutive pair of the response packets. From among the calculated difference values, the minimum value, the first quartile, the median, the third quartile and the maximum value of the changes in the port numbers are extracted (step S107). Each of the extracted values is temporarily stored in the RAM 83 as the rule information (step S109). The CPU 81 terminates the rule information identification processing and returns to the first terminal device processing shown in FIG. 7.

As shown in FIG. 7, following the rule information identification processing (step S53), based on the information stored in the RAM 83, a determination is made as to whether the rule information has been identified in the rule information identification processing (step S59). In a case where the rule information has been identified (yes at step S59), the CPU 81 advances to the processing at step S61 shown in FIG. 8. In a case where the rule information has not been identified (no at step S59), the CPU 81 terminates the first terminal device processing.

Figure 8:
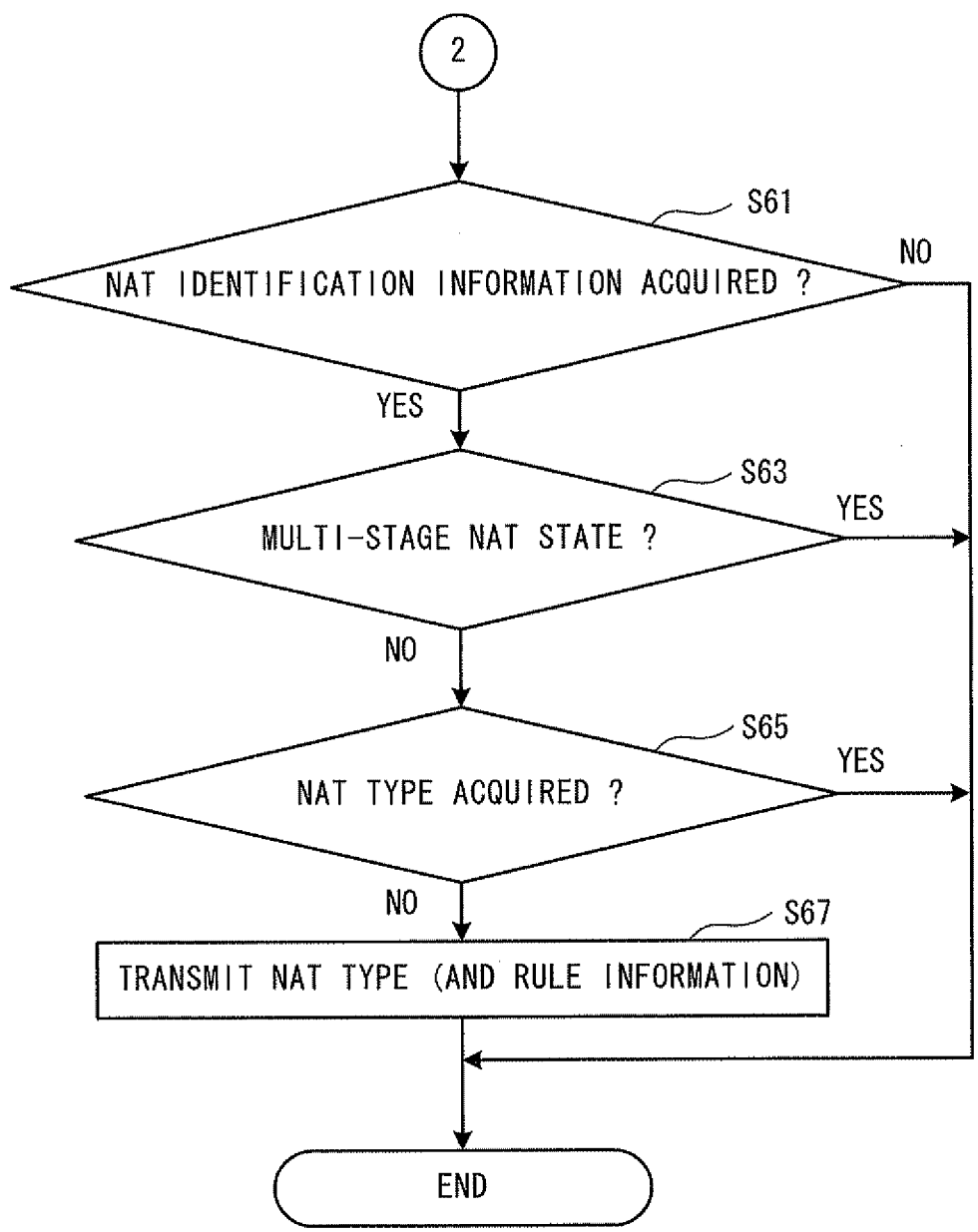
FIG. 8 is a flowchart showing the first terminal device processing, continued from FIG. 7.
Figure 9:
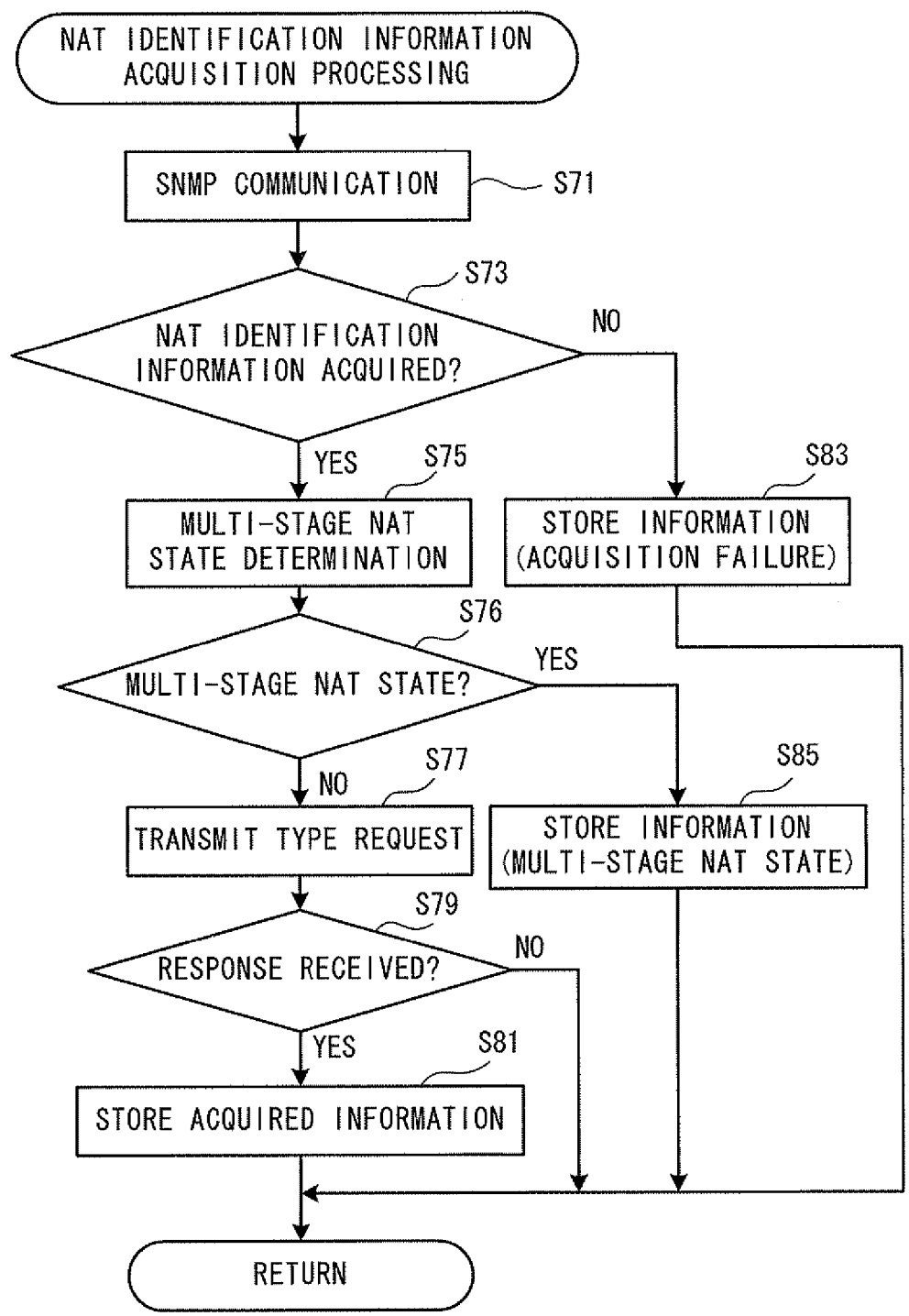
FIG. 9 is a flowchart showing NAT identification information acquisition processing.

At step S61 shown in FIG. 8, based on the information stored in the RAM 83, a determination is made as to whether the NAT identification information has been acquired through the NAT identification information acquisition processing at step S31 shown in FIG. 7 (step S61). In a case where the NAT identification information has not been acquired (no at step S61), the CPU 81 terminates the first terminal device processing.

In a case where the NAT identification information has been acquired (yes at step S61), a determination is made as to whether the NAT device 6 is in the multi-stage NAT state, based on the information stored in the RAM 83 (step S63). In a case where the NAT device 6 is in the multi-stage NAT state (yes at step S63), the CPU 81 terminates the first terminal device processing.

In a case where the NAT device 6 is not in the multi-stage NAT state (no at step S63), based on the information stored in the RAM 83, a determination is made as to whether the NAT type has been acquired from the communication control device 5 (step S65). In a case where the NAT type has been acquired from the communication control device 5 (yes at step S65), the NAT type has already been stored in the communication control device 5. Therefore, the CPU 81 terminates the first terminal device processing without performing any other processing.

In a case where the NAT type has not been acquired from the communication control device 5 (no at step S65), the NAT type of the NAT device 6 may not be stored in the communication control device 5. Therefore, the NAT type of the NAT device 6 stored in the RAM 83 is transmitted to the communication control device 5, together with the NAT identification information and the like, more specifically, the NAT identification information, the MAC address and IP address of the NAT device 8, and the bandwidth utilization of the LAN 12, that have been acquired at step S71 of the NAT identification information acquisition processing shown in FIG. 9 (step S67). In a case where the NAT type is Symmetric NAT, the NAT type and the rule information are transmitted to the communication control device 5, together with the NAT identification information and the like (step S67). The CPU 81 then terminates the first terminal device processing.

Second terminal device processing will be described with reference to FIG. 11. The second terminal device processing is started and executed by the CPU 81 when an operation to start P2P communication with the other terminal device 11 is performed via the keyboard 851 of the terminal device 11. In the second terminal device processing, processing to start P2P communication with the other terminal device 11 is executed. In the description below, assuming a case where an operation to start communication with the terminal device 10 is performed on the terminal device 9, the second terminal device processing executed by the CPU 81 of the terminal device 9 will be explained.

Figure 11:
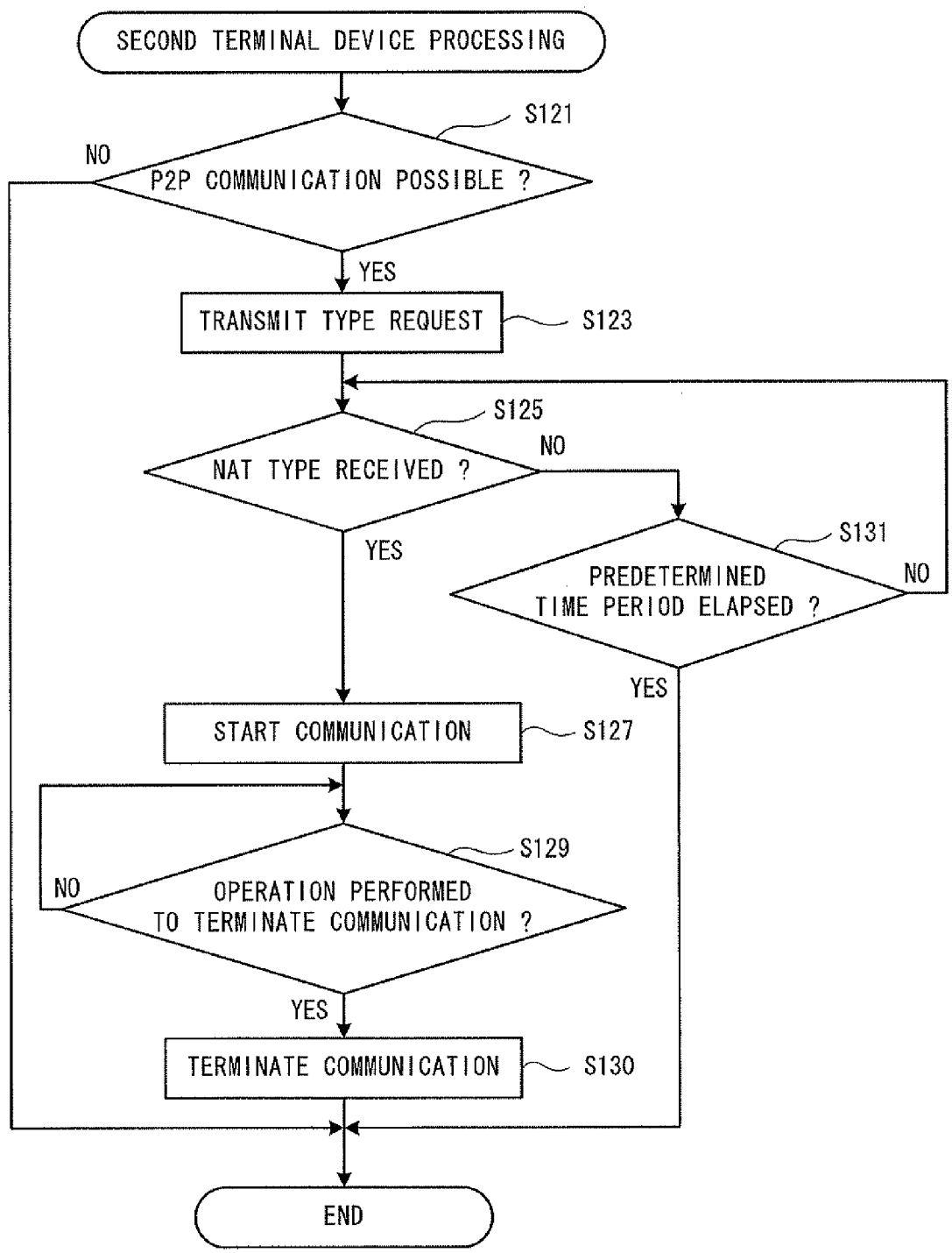
FIG. 11 is a flowchart showing second terminal device processing.

As shown in FIG. 11, based on the information stored in the RAM 83, a determination is made as to whether the terminal device 9 is in a state where P2P communication can be performed with the terminal device 10 (step S121). In a case where a determination has been made, at step S23 of the first terminal device processing shown in FIG. 6, that P2P communication is not possible, in a case where a determination has been made, at step S61 shown in FIG. 8, that the NAT identification information has not been acquired (no at step S61), and in a case where a determination has been made at step S63 that the NAT device 6 is in the multi-stage NAT stage (yes at step S63), a determination is made that P2P communication cannot be performed with the terminal device 10 (no at step S121). In this case, the CPU 81 terminates the second terminal device processing without performing any other processing.

In a case where a determination is made that P2P communication with the terminal device 10 is possible (yes at step S121), a type request packet, which requests the NAT type and the rule information of the NAT device 6 that is directly connected to the terminal device 9, is transmitted to the communication control device 5 (step S123). The type request packet is transmitted together with the NAT identification information and the like (namely, the NAT identification information, the MAC address and IP address of the NAT device 8, and the bandwidth utilization of the LAN 12) that have been acquired at step S71 of the NAT identification information acquisition processing shown in FIG. 9. In a case where a response packet has not been received from the communication control device 5 (no at step S125), a determination is made as to whether a predetermined time period has elapsed from the transmission of the type request packet (step S131). In a case where the elapsed time is less than the predetermined time period (no at step S131), the CPU 81 returns to the processing at step S125 and continuously monitors reception of the response packet. In a case where the elapsed time is equal to or more than the predetermined time period (yes at step S131), the CPU 81 terminates the second terminal device processing without starting P2P communication with the terminal device 10.

In a case where the response packet has been received before the predetermined time period has elapsed (yes at step S125), the NAT type included in the response packet is temporarily stored in the RAM 83. Further, in a case where the NAT type is Symmetric NAT, the rule information that is included in the response packet together with the NAT type is also temporarily stored in the RAM 83. P2P communication is started with the terminal device 10 based on the stored NAT type, or on the stored NAT type and rule information (step S127).

P2P communication between the terminal device 9 and the terminal device 10 may be started in the following manner, for example. The NAT type (or the NAT type and the rule information) of the NAT device 6, and a standard port number of the NAT device 6 are notified from the terminal device 9 to the terminal device 10 via the communication control device 5. An optimal communication start-up procedure is selected in the terminal device 10, based on the received NAT type (or the NAT type and the rule information) of the NAT device 6, and the NAT type (or the NAT type and the rule information) of the NAT device 7 that is directly connected to the terminal device 10. For example, UDP hole punching or UDP multi-hole punching can be used as a communication start-up procedure. As a result of performing communication based on the selected communication start-up procedure, the port number to be used to perform P2P communication between the terminal device 9 and the terminal device 10 is stored in the NAT device 6 and the NAT device 7. The terminal device 9 and the terminal device 10 respectively transmit packets to the stored port number. The NAT device 6 and the NAT device 7 transfer the packets without blocking them. Thus, P2P communication becomes possible between the terminal device 9 and the terminal device 10. As described above, the communication start-up procedure necessary to start P2P communication is selected based on the NAT type, or the NAT type and the rule information, of the NAT device 8 that is directly connected to the terminal device 11, and on the NAT type, or the NAT type and the rule information, of the NAT device 8 that is directly connected to the other terminal device 11, which is a communication partner. As a result of performing communication based on the selected communication start-up procedure, the NAT device 8 becomes capable of transferring a packet. Thus, it is possible to perform P2P communication between the two terminal devices 11.

In a case where the NAT types of the NAT device 6 and the NAT device 7 are Address-Restricted Cone NAT, P2P communication may become possible by UDP hole punching. The terminal device 10 transmits a packet and causes the NAT device 7 to store the port number. The terminal device 9 transmits a packet to the port having the port number stored in the NAT device 7. As a result of performing bidirectional communication using this method, P2P communication can be performed between the terminal device 9 and the terminal device 10.

In a case where the NAT types of the NAT device 6 and the NAT device 7 are Symmetric NAT, P2P communication may become possible by UDP multi-hole punching. The terminal device 10 transmits a plurality of packets and causes the NAT device 7 to store a plurality of port numbers. In order to search for the port numbers stored in the NAT device 7, the terminal device 9 transmits to the terminal device 10 a plurality of packets (search packets) having different destination port numbers. The destination port number of a search packet that has passed through the NAT device 7 is the port number to be stored in the NAT device 7. Therefore, after that, the terminal device 9 transmits packets to this port number. As a result of performing bidirectional communication using this method, P2P communication can be performed between the terminal device 9 and the terminal device 10.

The rule information may be used when destination port numbers are determined of the search packets to be transmitted to search for the port numbers. The destination port numbers may be determined in the following manner, for example. It is assumed that the NAT type (symmetric NAT) of the NAT device 7, the rule information (the minimum value, the first quartile, the median, the third quartile and the maximum value of the changed width of the port number), and a standard port number are notified from the terminal device 10 to the terminal device 9 via the communication control device 5. In the terminal device 9, values ranging from a value (P+X1) that is obtained by adding the minimum value (X1) to the standard port number (P), to a value (P+X2) that is obtained by adding the maximum value (X2) to the standard port number (P) are determined as the destination port numbers of the search packets. The search packets that are created in this manner are transmitted from the terminal device 9 to the terminal device 10. There is a high likelihood that one of the determined destination port numbers corresponds to the port number stored in the NAT device 7 (which will be described later in detail). Accordingly, there is a high probability that a packet transmitted from the terminal device 9 reaches the terminal device 10. Therefore, P2P communication can be started between the terminal device 9 and the terminal device 10, while reducing the number of transmitted packets to a minimum.

Note that a method of determining the destination port numbers is not limited to the above-described method, and any other method may be used for calculation. For example, values ranging from a value (P+X3) that is obtained by adding the first quartile (X3) to the standard port number (P), to a value (P+X4) that is obtained by adding the third quartile (X4) to the standard port number (P) may be set.

As shown in FIG. 11, after P2P communication has been started (step S127), the CPU 81 stands by until an operation is performed via the keyboard 851 to terminate the P2P communication in progress (no at step S129). When the operation to terminate the P2P communication is performed (yes at step S129), the CPU 81 performs processing to terminate the P2P communication in progress (step S130), and then terminates the second terminal device processing.

Figure 12:
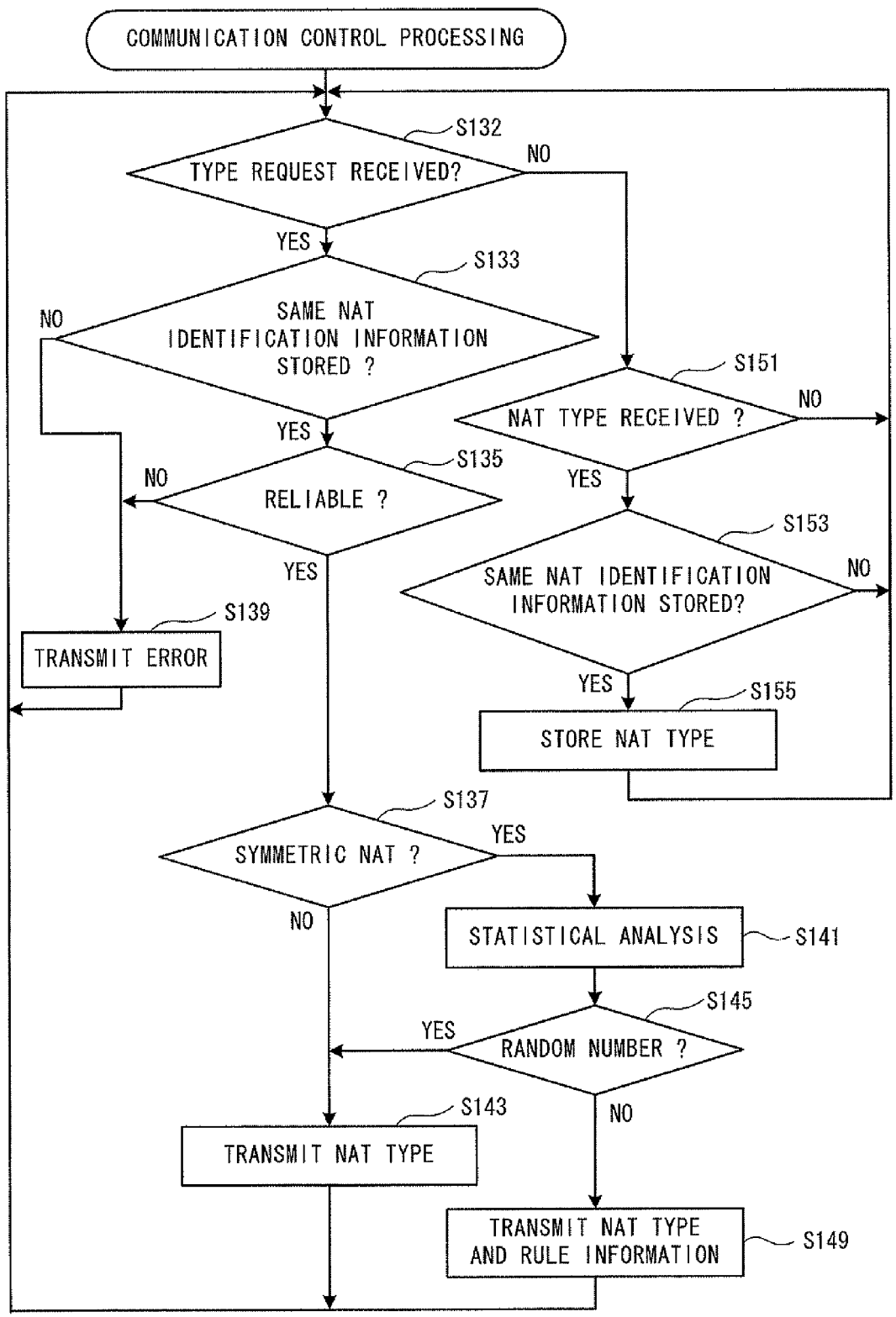
FIG. 12 is a flowchart showing communication control processing.

Communication control processing will be explained with reference to FIG. 12. The communication control processing is started and executed by the CPU 21 when a power source of the communication control device 5 is turned on. In the communication control processing, the NAT type (or the NAT type and the rule information) received from the terminal device 11 is stored in the NAT information table that is stored in the HDD 24. Further, in the communication control processing, the NAT type (or the NAT type and the rule information) is transmitted to the terminal device 11, in response to a request from the terminal device 11. Note that it is assumed that the NAT identification information (the model names and versions) is input in advance into the communication control device 5 by the administrator via the keyboard 251. Therefore, the NAT identification information is stored in advance in the NAT information table that is stored in the HDD 24.

When the communication control processing is started, a determination is made as to whether the type request packet and the NAT identification information etc. have been received from any one of the terminal devices 11 (step S132). In a case where the NAT identification information etc. have not been received (no at step S132), a determination is made as to whether the NAT type (or the NAT type and the rule information) and the NAT identification information etc. have been received from the terminal device 11 (step S151). In a case where none of them have been received (no at step S151), the CPU 21 returns to the processing at step S132, and repeats the above-described processing.

In a case where the NAT identification information etc. and the NAT type (or the NAT type and the rule information) have been received (yes at step S151), the NAT identification information is referred to, and a determination is made as to whether the same NAT identification information is stored in the NAT information table (step S153). In a case where the same NAT identification information is stored (yes at step S153), the received NAT type (or the received NAT type and rule information) is stored in the NAT information table in association with the NAT identification information that has been determined as the same information (step S155). Further, the received bandwidth utilization and MAC address are also stored in the NAT information table in association with the NAT identification information that has been determined as the same information (step S155). The CPU 21 returns to the processing at step S132, and repeats the above-described processing. In a case where the same NAT identification information is not stored in the NAT information table (no at step S153), the CPU 21 returns to the processing at step S132, and repeats the above-described processing. The NAT information table 241 shown in FIG. 5, for example, can be created by repeating the processing.

In the processing at step S132, in a case where a determination is made that the type request packet and the NAT identification information etc. have been received from the terminal device 11 (yes at step S132), a determination is made as to whether information that matches the received NAT identification information is stored in the NAT information table (step S133). In a case where the same NAT identification information is not stored in the NAT information table (no at step S133), an error packet that notifies the terminal device 11 of the fact that the corresponding information is not registered is transmitted to the terminal device 11 (step S139). The CPU 21 returns to the processing at step S132 and repeats the above-described processing.

In a case where the same information as the received NAT identification information is stored in the NAT information table (yes at step S133), a determination is made as to whether the terminal device 11 that is the transmission source is reliable (step S135). It is assumed that in the communication control device 5, MAC addresses of reliable terminal devices 11 are registered in a registrant list and managed. A determination is made as to whether the MAC address stored as the registrant in the NAT information table matches any of the MAC addresses registered in the registrant list. In a case where there is no matching MAC address in the registrant list, a determination is made that the terminal device 11 is not reliable (no at step S135). Therefore, an error packet is transmitted to the terminal device 11 (step S139). The CPU 21 returns to the processing at step S132 and repeats the above-described processing.

In a case where the MAC address of the terminal device 11 is registered in the registrant list, a determination is made that the terminal device 11 that has transmitted the type request packet is reliable (yes at step S135). The NAT type that is associated with the received NAT identification information in the NAT information table is referred to, and a determination is made as to whether the NAT type is Symmetric NAT (step S137). In a case where the NAT type is not Symmetric NAT (no at step S137), a response packet including the referred NAT type is transmitted to the terminal device 11 (step S143). The CPU 21 returns to the processing at step S132 and repeats the above-described processing.

In a case where the NAT type is Symmetric NAT (yes at step S137), the rule information stored in the NAT information table is statistically analyzed, and the rule information corresponding to the bandwidth utilization is identified (step S141).

Figure 13:
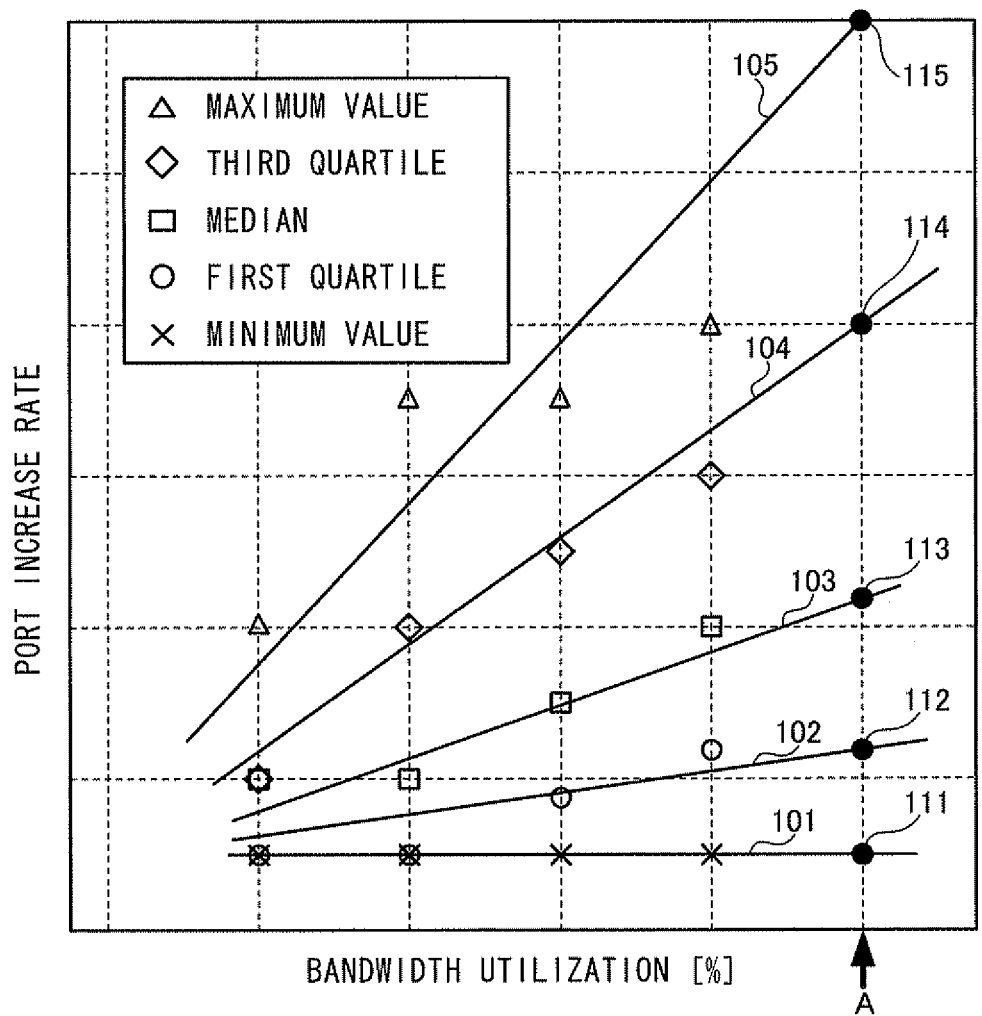
FIG. 13 is a diagram illustrating a statistical analysis method.

With reference to FIG. 13, an example of a statistical analysis method for analyzing the rule information will be explained. The rule information stored in the NAT information table is classified into the minimum value, the first quartile, the median, the third quartile and the maximum value of the changes in the port numbers. Linear approximation is applied to each item of the classified rule information, and approximate straight lines are obtained. A least squares method, for example, can be used as a linear approximation method. In the example shown in FIG. 13, an approximate straight line 101 of the minimum value, an approximate straight line 102 of the first quartile, an approximate straight line 103 of the median, an approximate straight line 104 of the third quartile, and an approximate straight line 105 of the maximum value are respectively schematically illustrated.

The rule information corresponding to the bandwidth utilization is identified based on the calculated approximate straight lines. For example, it is assumed that the bandwidth utilization received together with the type request packet is "A" in FIG. 13. Among the values on the straight line 101, the value 111 that corresponds to the bandwidth utilization A is set as the minimum value of the changes in the port numbers when responding to the terminal device 11. In a similar manner, among the values on the straight line 102, the value 112 that corresponds to the bandwidth utilization A is set as the first quartile. Among the values on the straight line 103, the value 113 that corresponds to the bandwidth utilization A is set as the median. Among the values on the straight line 104, the value 114 that corresponds to the bandwidth utilization A is set as the third quartile. Among the values on the straight line 105, the value 115 that corresponds to the bandwidth utilization A is set as the maximum value. In this manner, the rule information can be obtained.

A packet error rate (a probability that a packet does not reach a partner) between one terminal device 11 (for example, the terminal device 9) and another terminal device 11 (for example, the terminal device 10) depends on a bandwidth utilization of a network. The packet error rate tends to increase as the bandwidth utilization increases. For example, in a case where a packet that is transmitted from the terminal device 10 in order to cause the NAT device 7 to store a port number does not reach the partner terminal device 9, a packet is re-transmitted from the terminal device 10. In this case, the port number stored in the NAT device 7 is updated. From the terminal device 9, in order to search for the updated port number stored in the NAT device 7, search packets are transmitted. In the present embodiment, in the terminal device 9, the destination port numbers of the search packets are determined based on the rule information that is obtained in the above-described manner, and the search packets are transmitted. Therefore, even when the port number stored in the NAT device 7 is changed depending on the bandwidth utilization, the terminal device 9 can identify the port number stored in the NAT device 7.

A determination is made as to whether the rule information obtained by the statistical analysis is a random number (step S14). Whether the rule information is a random number can be determined by, for example, determining whether or not a value obtained by subtracting the first quartile from the third quartile is equal to or larger than a predetermined threshold value. In a case where a determination is made that the rule information is a random number (yes at step S145), the rule information is not transmitted to the terminal device 11, and only the NAT type (Symmetric NAT) is returned (step S143). In a ease where a determination is made that the rule information is not a random number (no at step S145), the rule information (the minimum value, the first quartile, the median, the third quartile and the maximum value) is transmitted to the terminal device 11, together with the NAT type (step S149). The CPU 21 terminates the communication control processing.

As described above, the terminal device 11 can acquire the NAT type, or the NAT type and the rule information of the NAT device 8, from the communication control device 5. The terminal device 11 can perform communication with the other terminal device II based on the acquired information. Since the terminal device 11 can rapidly acquire the type information and the rule information without consuming time, it is possible to reduce time to start communication with the other terminal device 11.

Figure 10:
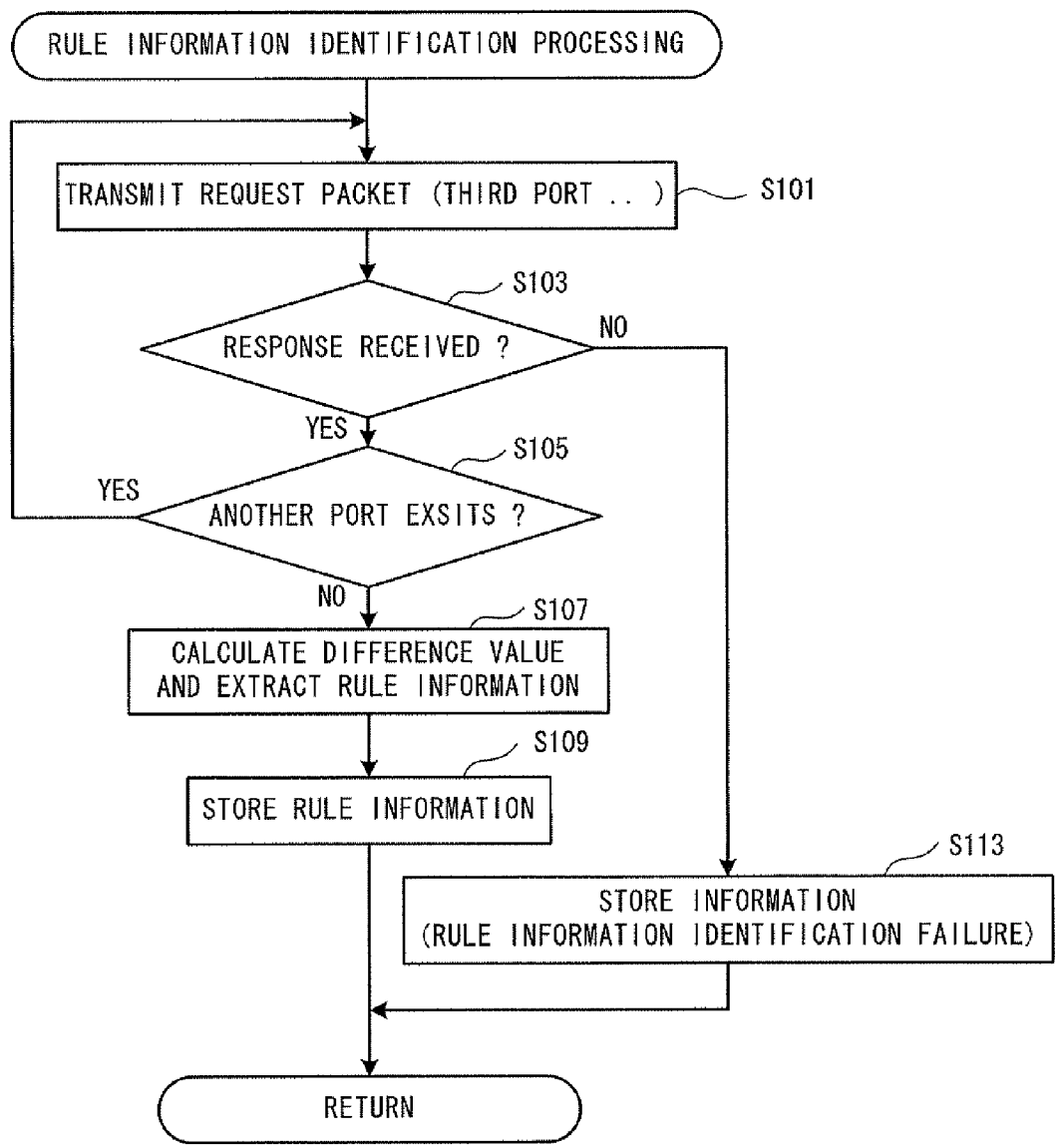
FIG. 10 is a flowchart showing rule information identification processing.

In the rule information identification processing shown in FIG. 10, the terminal device 11 can identify the rule information by transmitting and receiving a plurality of packets to and from the communication control device 5. Therefore, it is possible to easily and rapidly identify the rule information.

The communication control device 5 statistically analyzes the rule information that is received from the terminal device 11 and stored in the NAT information table. The communication control device 5 can thereby reduce an influence due to an error or a noise of the rule information, and improve the accuracy of the rule information. Therefore, the terminal device 11 can reliably start P2P communication with the other terminal device 11. Particularly, in the present embodiment, the communication control device 5 can set the rule information corresponding to the bandwidth utilization. Therefore, it is possible to reduce an influence due to an error or a noise that depends on the bandwidth utilization.

The terminal device 11 can acquire the NAT identification information directly from the NAT device 8 based on SNMP. For example, even when the NAT device 8 is replaced with another device, it is possible to omit a troublesome operation of changing settings of the NAT identification information of the NAT device 8.

In a case where the NAT device 6 connected to the terminal device 11 is in a multi-stage NAT state, the terminal device 11 determines that P2P communication cannot be performed, and the terminal device 11 does not transmit a type request packet to the communication control device 5. Therefore, it is possible to avoid a communication failure that may occur if communication with the other terminal device 11 is started.

The present invention is not limited to the above-described embodiment, and various modifications are possible. In the above-described embodiment, corresponding to the bandwidth utilization, the minimum value, the first quartile, the median, the third quartile and the maximum value of the changes in the port numbers are identified as the rule information. However, for example, the rule information may be identified based on an average value that is calculated corresponding to the bandwidth utilization, or on a probability distribution. Further, in the present embodiment, the rule information is identified by obtaining a linear approximation line. However, the rule information may be identified using approximation by a particular function.

In the above-described embodiment, the bandwidth utilization of the LAN 14 is acquired by SNMP-based communication. However, the bandwidth utilization may be obtained by the terminal device 11 capturing packets of the LAN 14. Further, in the above-described embodiment, the rule information is identified based on the bandwidth utilization of the LAN 14. However, the rule information may be identified based on the bandwidth utilization of the Internet 15, for example.

In the above-described embodiment, the first terminal device processing shown in FIG. 6 to FIG. 8 is started when the power source of the terminal device 11 is turned on. However, the first terminal device processing may be repeatedly executed at a predetermined interval, for example. In this case, even when the NAT information of the NAT device 8 is changed, the terminal device 11 can rapidly recognize the changed NAT information and can register it in the communication control device 5.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A communication system comprising:
 a communication control device that is configured to connect to an external network;
 a network address translation (NAT) device that connects is configured to connect to the external network and that has a NAT function; and
 a terminal device that connects is configured to connect to an internal network that is under control of the NAT device,
 wherein the terminal device comprises:
  a type request transmitting portion that transmits, is configured to transmit, to the communication control device, a type request signal together with NAT identification information that identifies the NAT device in order to communicate with another terminal device that is a communication partner, wherein the type request signal requesting transmission of the NAT type information; information, wherein the NAT type information is type information, or the type information and rule information, and wherein the type information is information that classifies the NAT device based on information provided when the NAT device determines whether or not to allow a received packet to be transferred, and the rule information is information relating to an update rule of a port number based on which the NAT device performs port mapping;

a type response receiving portion that is configured to receive the NAT type information transmitted from the communication control device in response to the type request signal transmitted by the type request transmitting portion;

a first communication portion that is configured to perform communication with the other terminal device using the NAT type information received by the type response receiving portion;

a NAT information identification portion that is configured to identify the NAT type information of the NAT device, in a case where the NAT type information is not transmitted from the communication control device in response to the type request signal; and a NAT information transmitting portion that is configured to transmit, to the communication control device, the NAT type information identified by the NAT information identification portion and the NAT identification information, and wherein the communication control device comprises:

a type request receiving portion that is configured to receive the type request signal and the NAT identification information transmitted by the type request transmitting portion;

a type response transmitting portion, that is configured to transmit, based on the NAT identification information and the type request signal received by the type request receiving portion, in a case where the NAT type information associated with the NAT identification information is stored in the storage device, the NAT type information stored in association with the NAT identification information, to the terminal device that has transmitted the type request signal;

a NAT information receiving portion that is configured to receive the NAT identification information and the NAT type information transmitted by the NAT information transmitting portion; and a storage control portion that is configured to store, in a storage device, the NAT identification information and the NAT type information received by the NAT information receiving portion in association with each other.

2. The communication system according to claim 1, wherein:

the terminal device further comprises a second communication portion that is configured to transmit a plurality of first signals to the communication control device and that is configured to receive a plurality of second signals transmitted from the communication control device in response to each of the plurality of first signals; and the NAT information identification portion is configured to extract two destination port numbers that respectively correspond to two of the plurality of second signals that are consecutively received by the second communication portion, and identify the rule information by calculating a difference between the two destination port numbers.

3. The communication system according to claim 2, wherein:

the communication control device further comprises an analysis portion that is configured to statistically analyze the rule information in a case where the type request signal is received by the type request receiving portion, and in a case where the NAT type information stored in the storage device in association with the NAT identification information includes the rule information; and the type response transmitting portion is configured to transmit, to the terminal device, the NAT type information that includes the rule information analyzed by the analysis portion.

4. The communication system according to claim 3, wherein:

the terminal device further comprises a bandwidth utilization acquisition portion that is configured to acquire a bandwidth utilization of one of the external network and the internal network when communication is performed by the second communication portion;

the NAT information transmitting portion is configured to transmit, to the communication control device, the bandwidth utilization acquired by the bandwidth utilization acquisition portion, together with the NAT type information and the NAT identification information;

the NAT information receiving portion is configured to receive the bandwidth utilization, the NAT identification information and the NAT type information transmitted by the NAT information transmitting portion;

the storage control portion is configured to store, in the storage device, the bandwidth utilization, the NAT identification information and the NAT type information received by the NAT information receiving portion in association with one another;

the type request transmitting portion is configured to transmit the bandwidth utilization to the communication control device, together with the type request signal and the NAT identification information;

the type request receiving portion is configured to receive the bandwidth utilization, together with the type request signal and the NAT identification information; and the analysis portion is configured to statistically analyze the bandwidth utilization and the rule information stored in the storage device, and the bandwidth utilization received by the type request receiving portion.

5. The communication system according to claim 1, wherein:

the terminal device further comprises a NAT identification information acquisition portion that is configured to acquire the NAT identification information based on a simple network management protocol (SNMP); and the NAT information transmitting portion is configured to transmit, to the communication control device, the NAT identification information acquired by the NAT identification information acquisition portion.

6. The communication system according to claim 1, wherein:

the terminal device further comprises a determination portion that is configured to determine whether the NAT device is connected to the external network via another NAT device; and the type request transmitting portion is configured to transmit the type request signal and the NAT identification information only in a case where the determination portion determines that the NAT device is connected to the external network without the other NAT device therebetween.

7. A terminal device that is configured to connect to an internal network that is under control of a network address translation (NAT) device, the NAT device being configured to connect to an external network and having a NAT function, the terminal device comprising:

a type request transmitting portion that is configured to transmit, to a communication control device that is configured to connect to the external network, a type request signal together with NAT identification information that identifies the NAT device in order to communicate with another terminal device that is a communication partner, wherein the type request signal requesting transmission of NAT type information, wherein the NAT type information is type information, or the type information and rule information, and wherein the type information is information that classifies the NAT device based on information provided when the NAT device determines whether or not to allow a received packet to be transferred, and the rule information is information relating to an update rule of a port number based on which the NAT device performs port mapping;

a type response receiving portion that is configured to receive the NAT type information transmitted from the communication control device in response to the type request signal transmitted by the type request transmitting portion;

a first communication portion that is configured to perform communication with the other terminal device using the NAT type information received by the type response receiving portion;

a NAT information identification portion that is configured to receive the NAT type information of the NAT device, in a case where the NAT type information is not transmitted from the communication control device in response to the type request signal; and a NAT information transmitting portion that is configured to transmit, to the communication control device, the NAT type information identified by the NAT information identification portion and the NAT identification information.

8. The terminal device according to claim 7, further comprising:

a second communication portion that is configured to transmit a plurality of first signals to the communication control device and that is configured to receive a plurality of second signals transmitted from the communication control device in response to each of the plurality of first signals, wherein the NAT information identification portion is configured to extract two destination port numbers that respectively correspond to two of the plurality of second signals that are consecutively received by the second communication portion, and identify the rule information by calculating a difference between the two destination port numbers.

9. The terminal device according to claim 7, further comprising:

a NAT identification information acquisition portion that is configured to acquire the NAT identification information based on a simple network management protocol (SNMP), wherein the NAT information transmitting portion is configured to transmit, to the communication control device, the NAT identification information acquired by the NAT identification information acquisition portion.

10. The terminal device according to claim 7, further comprising:

a determination portion that is configured to determine whether the NAT device is connected to the external network via another NAT device, wherein the type request transmitting portion is configured to transmit the type request signal and the NAT identification information only in a case where the determination portion determines that the NAT device is connected to the external network without intervention by the other NAT device.

11. A communication control device that is configured to connect to an external network, the communication control device comprising:

a type request receiving portion that is configured to receive a type request signal and network address translation (NAT) identification information transmitted from a terminal device that is configured to connect to an internal network that is under control of a NAT device, the NAT device being configured to connect to the external network and having a NAT function, wherein the NAT identification information is information that identifies the NAT device, wherein the type request signal is a signal that requests transmission of NAT type information for the terminal device in order to communicate with another terminal device that is a communication partner, wherein the NAT type information is type information, or the type information and rule information, and wherein the type information is information that classifies a NAT device based on information provided when the NAT device determines whether or not to allow a received packet to be transferred, and the rule information is information relating to an update rule of a port number based on which the NAT device performs port mapping;

a type response transmitting portion that is configured to transmit, based on the type request signal and the NAT identification information received by the type request receiving portion, in a case where the NAT type information associated with the NAT identification information is stored in a storage device, the NAT type information stored in association with the NAT identification information, to the terminal device that has transmitted the type request signal;

a NAT information receiving portion that is configured to receive the NAT identification information and the NAT type information transmitted from the terminal device; and a storage control portion that is configured to store, in a storage device, the NAT identification information and the NAT type information received by the NAT information receiving portion in association with each other.

12. The communication control device according to claim 11, further comprising:

an analysis portion that is configured to statistically analyze the rule information in a case where the type request signal is received by the type request receiving portion, and in a case where the NAT type information stored in the storage device in association with the NAT identification information includes the rule information, wherein the type response transmitting portion is configured to transmit, to the terminal device, the NAT type information that includes the rule information analyzed by the analysis portion.

13. The communication control device according to claim 12, wherein:

the NAT information receiving portion is configured to receive, from the terminal device, a bandwidth utilization of one of the external network and the internal network, together with the NAT identification information and the NAT type information;

the storage control portion is configured to store, in the storage device, the bandwidth utilization, the NAT identification information and the NAT type information received by the NAT information receiving portion in association with one another;

the type request receiving portion is configured to receive the bandwidth utilization from the terminal device, together with the type request signal and the NAT identification information; and the analysis portion is configured to statistically analyze the bandwidth utilization and the rule information stored in the storage device, and the bandwidth utilization received by the type request receiving portion.

* * * * *